United States Patent
Macrae

(10) Patent No.: US 9,873,521 B2
(45) Date of Patent: Jan. 23, 2018

(54) AIRCRAFT INTERFACE

(71) Applicant: Bluebox Avionics Limited, Langley (GB)

(72) Inventor: James Macrae, Langley (GB)

(73) Assignee: Bluebox Avionics Limited, Langley, Slough (GB)

( * ) Notice: Subject to any disclaimer, the term of this patent is extended or adjusted under 35 U.S.C. 154(b) by 0 days.

(21) Appl. No.: 14/586,398

(22) Filed: Dec. 30, 2014

(65) Prior Publication Data

US 2015/0109150 A1  Apr. 23, 2015

Related U.S. Application Data

(63) Continuation of application No. 13/697,845, filed as application No. PCT/GB2011/000720 on May 12, 2011, now Pat. No. 8,957,791.

(30) Foreign Application Priority Data

May 14, 2010 (GB) .................................. 1008085.1

(51) Int. Cl.
| | | |
|---|---|---|
| G08B 21/00 | (2006.01) | |
| B64D 43/00 | (2006.01) | |
| G08C 17/00 | (2006.01) | |
| G08C 17/02 | (2006.01) | |

(52) U.S. Cl.
CPC ............. *B64D 43/00* (2013.01); *G08C 17/00* (2013.01); *G08C 17/02* (2013.01); *G08C 2201/40* (2013.01)

(58) Field of Classification Search
CPC .............................. G08G 5/0095; B64D 43/00

USPC ............ 340/945, 947, 971, 973, 990, 995.1; 348/117; 701/14, 25, 35, 120, 144
See application file for complete search history.

(56) References Cited

U.S. PATENT DOCUMENTS

| | | | |
|---|---|---|---|
| 6,014,381 A | 1/2000 | Troxel et al. | |
| 6,661,353 B1 * | 12/2003 | Gopen | G09B 29/006 340/963 |
| 6,757,712 B1 * | 6/2004 | Bastian | B64D 11/0015 709/203 |
| 8,605,917 B2 | 12/2013 | Bleacher et al. | |
| 2004/0073571 A1 * | 4/2004 | Kumhyr | G08G 1/005 |

(Continued)

FOREIGN PATENT DOCUMENTS

WO  WO 2006/071457  7/2006

OTHER PUBLICATIONS

International Search Report from PCT/GB2011/000720—2 pages.

*Primary Examiner* — Tai T Nguyen
(74) *Attorney, Agent, or Firm* — Dority & Manning, P.A.

(57) ABSTRACT

An aircraft interface apparatus for providing communication between an aircraft system and a device for use on an aircraft comprises a first communication means for providing communication with the aircraft system, and a second communication means for providing communication with the device, wherein the aircraft system uses a first data format and the device uses a second data format, and the apparatus further comprises: an interface processing resource that is configured to receive data in a first format from the device and, in response, to output data in the second format to the aircraft system and/or to receive data in the second format from the device and, in response, to output data in the first format to the aircraft system.

9 Claims, 9 Drawing Sheets

(56) References Cited

U.S. PATENT DOCUMENTS

| | | | |
|---|---|---|---|
| 2005/0268319 A1 | 12/2005 | Brady | |
| 2006/0143662 A1* | 6/2006 | Easterling | H04N 5/50 |
| | | | 725/76 |
| 2007/0213009 A1* | 9/2007 | Higashida | H04B 7/18508 |
| | | | 455/62 |
| 2008/0154442 A1* | 6/2008 | Wipplinger | G01C 23/00 |
| | | | 701/3 |
| 2009/0282469 A1* | 11/2009 | Lynch | H04W 12/06 |
| | | | 726/11 |
| 2010/0191754 A1* | 7/2010 | Baker | G06Q 10/109 |
| | | | 707/758 |
| 2011/0219409 A1 | 9/2011 | Frisco et al. | |
| 2012/0009951 A1* | 1/2012 | Poland | G08G 5/0021 |
| | | | 455/457 |

* cited by examiner

AIRCRAFT INTERFACE

PRIORITY CLAIM

The present invention is a continuation of U.S. application Ser. No. 13/697,845 having a filing date of Jan. 30, 2013 (issued on Feb. 17, 2015 as U.S. Pat. No. 8,957,791); which is a nationalization of PCT Application Number PCT/GB2011/000720 having a filing date of May 12, 2011; which is based on the GB Application Number 1008085.1 having a filing date of May 14, 2010, all of which are incorporated by reference herein.

FIELD OF THE INVENTION

The present invention relates to interfaces for aircraft systems, for example aircraft cabin management systems. The invention also relates to, for example, communication between such aircraft cabin management systems and passenger or flight attendant input devices for controlling aspects of the cabin environment. The present invention also relates to the interaction between aircraft cabin management systems and in-flight entertainment systems.

BACKGROUND TO THE INVENTION

All commercial passenger aircraft include a cabin management system for control or monitoring of various aspects of the cabin environment, for example call bells, cabin lighting, heating, and ventilation, cabin intercom, emergency and galley systems.

Usually the cabin management system comprises a server or control computer that is connected by wired connections to user input devices at each passenger seat, for example call bell buttons and lighting circuitry, and to cabin heating, lighting, ventilation and other systems. The server or control computer is also connected via a wired connection to a flight attendant panel that includes various inputs and outputs (for example buttons, screen, keyboard and/or mouse) that allows flight attendants to monitor and control aspects of the cabin environment via the server or control computer, and to monitor call bell signals from individual passengers.

It can be time consuming and complex to install known cabin management systems and to connect them to passenger input devices at each seat. Furthermore, it is common in commercial aircraft to alter seat arrangements and spacings on a regular basis, for example increasing or decreasing the number of economy or business class seats depending on the route and season for which an aircraft is being used, and such changes in seat arrangements and spacings require disconnection and reconnection of passenger input devices to the cabin management system and, in many cases, the reconfiguration of the cabin management system, which again can be time consuming and costly. Any faults in components of the cabin management system can result in costly repair or maintenance procedures or in reduced level of passenger service.

In addition, known cabin management systems are usually specific to particular aircraft and it can be difficult to alter aspects of the system if desired. For example changes to different aspects of the system may require additional safety certification to be obtained.

In some known aircraft systems, the cabin server or control computer is also connected via wired connection to in-flight entertainment system terminals at each passenger seat. In such known systems, passenger input to the cabin management system (for example, call bell activation or lighting control) can be provided via handheld user input devices for the in-flight entertainment system or via soft buttons or other touch-screen inputs on a display screen of the entertainment system terminal. Passengers have increasingly high expectations of in-flight entertainment systems and the in-flight entertainment that is available can be a significant factor for passengers when selecting an airline. The up-dating and improvement of in-flight entertainment systems is made more complex when there is a need to ensure that the in-flight entertainment system, or associated components, can also be used to provide user input to the cabin management system that is specific to a particular aircraft. That also makes it more difficult to provide in-flight entertainment systems that can be used in stand-alone way in a variety of different aircraft, which is becoming increasingly desirable.

It is an aim of the present invention to provide improved or at least alternative apparatus and methods for communication between aircraft systems and devices.

SUMMARY OF THE INVENTION

In a first, independent aspect of the invention there is provided an aircraft interface apparatus for providing communication between an aircraft system and a device for use on an aircraft comprising a first communication means for providing communication with the aircraft system; and a second communication means for providing communication with the device, wherein the aircraft system uses a first data format and the device uses a second data format, and the apparatus further comprises an interface processing resource that is configured to receive data in a first format from the device and, in response, to output data in the second format to the aircraft system and/or to receive data in the second format from the device and, in response, to output data in the first format to the aircraft system.

By providing such an interface communication can be enabled between an aircraft system (for example a cabin management system) and a device (for example a passenger device) for use on an aircraft even if such systems and devices use incompatible formats. That can provide in turn for additional or more efficient passenger or flight attendant control over aircraft systems, and to enable such control via devices that would not previously have been able to access such systems, for example passenger personal electronic devices.

The second communication means may comprise wireless communication means for providing wireless communication with the device, for example a wireless transceiver and associated wireless transmission controller.

By providing such a wireless interface apparatus, wireless communication can be provided between aircraft systems and user input devices, which can reduce the amount of complexity of aircraft wiring that is required. In turn that can increase the ease and simplicity of installation of user devices and aircraft systems and provide greater flexibility in the arrangement of aircraft interior systems.

The first communication means may comprise wireless communication means. Alternatively or additionally one or both of the first communication means and the second communication means may be configured to provide a wired connection. The or each connection means may comprise a connector. The connector may be arranged to be connected by electric or fibre-optic wire or cable to the aircraft system or device. The connector may comprise, for example, a D25 connector, an RS232 connector, an RJ45 connector or an ARINC connector, for example an ARINC600 connector.

The data may comprise at least one of a message, or a file or a plurality of files. The interface processing resource may process the data before passing it to the other of the connection means or the wireless communication device. The processing may comprise modifying the data.

The interface processing resource may be configured to convert data between the first format and the second format, and the output data may comprises received data converted by the interface processing resource.

The aircraft system may comprise a system for controlling or monitoring any aspect of the aircraft flight, aircraft cabin, or aircraft or cabin environment.

The aircraft system may comprise an aircraft cabin management system. The provision of communication, for example wireless communication, between devices and an aircraft cabin management system can provide for simplification of the installation or modification of passenger seat arrangements whilst maintaining the ability of passengers to control aspects of the cabin environment.

Alternatively or additionally the aircraft system and/or the device may comprise a flight management system, a flight attendant panel, or an in-flight entertainment system or other content distribution system, or a component of one of those systems. The aircraft system may be a system that is configured for wired connection to the at least one user device and the interface device may adapt the aircraft system for wireless operation.

The first data format may comprise a first message format, a first communications protocol or a first instruction set. The second data format may comprise a second, different message format, a second, different communications protocol or a second, different instruction set.

The first format may comprise one or more of XML, http, https, TCP, UDP, or IP.

The second format may comprise, an ARINC format, for example one of the ARINC 429, ARINC 629, ARINC 619, ARINC 740, ARINC 744 and ARINC 818 formats.

The device may comprise a user device, for example at least one of an at-seat user terminal or an at-seat user input-device, or a portable electronic device, for example a mobile telephone, portable computer, or a portable entertainment system. The device may form part of a further aircraft system or may be a stand-alone device. The interface apparatus may be configured to communicate with a plurality of devices.

The received data may comprise an instruction from one of the aircraft system and the device, and the processing resource may be configured to convert the instruction into a corresponding instruction that is actionable by the other of the aircraft system and the device, and to provide the corresponding instruction to the other of the aircraft system and the device. The instruction, prior to conversion, may not be actionable by the other of the aircraft system and the device.

The first format may comprise a first message format, a first communications protocol or a first instruction set, and the second format may comprise a second, different message format, a second, different communications protocol or a second, different instruction set.

The first format may comprise a serial communication protocol and the second format may comprise a wireless communication protocol.

The interface processing resource may comprise selection means for selection of the first format from a plurality of first formats and/or for selection of the second format from a plurality of second formats.

The selection means may comprise a selection module operable to select the first format and/or the second format in response to operator input. The selection means may comprise a user input device, for example a GUI element, The apparatus may be configured for communication with an aircraft content distribution system, for example an aircraft in-flight entertainment system.

The device may comprise a component of the aircraft content distribution system, for example a user terminal. The received data may comprise a trigger signal from a or the cabin management system, and/or the output data may comprise a control signal. The control signal may be for controlling operation of the device, and may comprise for example a pause or resume command for pausing or resuming content.

The trigger signal may be representative of a state of the cabin management system. The trigger signal may be representative of the state of a component of the cabin management system, for example the state of an intercom system. The trigger signal may be representative of the starting or stopping of an audio output.

The trigger signal may be representative of the activation or deactivation of an intercom system.

The apparatus may be configured to monitor the state of the aircraft content distribution system and to provide a control signal to the cabin management system in response to detection of a predetermined state of the aircraft content management system.

The predetermined state of the aircraft content management system may comprise the transmission of forced video output, for example a safety message, by the content management system.

The control signal may comprise an instruction to activate or deactivate an aircraft intercom system.

The interface apparatus may be configured to provide audio output from the content distribution system to the cabin management system, for output via the intercom system of the cabin management system.

The interface processing resource may be configured to apply a security protocol to communications from the user devices.

The interface processing resource may be configured to apply the security protocol to exclude access of the user devices to at least some functions of the aircraft cabin management system.

The cabin management system and/or the wireless interface device may be connectable to an aircraft flight management system, and the interface processing resource may be configured to apply a security protocol to exclude the user devices from interfering with operation the flight management system.

The cabin management system and/or the wireless interface may be configurable such that the user devices have access to at least some data from the flight management system, and the interface processor device may be configured such that the user devices have read-only access to the flight management system.

The security protocol may comprise a secure socket layer (SSL) or transport layer security (TLS) protocol.

The at least one user device may comprise a flight attendant panel (FAP).

The apparatus may be configured to download interface software to the or each user device, the interface software being executable to provide a user input interface for inputting instructions for transmission to the cabin management system via the interface device.

In a further independent aspect of the invention there is provided an aircraft communication or management system comprising an aircraft system, a device for use on the aircraft and an aircraft interface apparatus as claimed or described herein, wherein the aircraft system uses a first format, the device uses a second format, and the aircraft system, the device and the interface apparatus are arranged so that in operation the aircraft system communicates with the device and/or the device communicates with the aircraft system via the interface apparatus.

In another independent aspect of the invention there is provided a method of providing communication between an aircraft system and a device for use on an aircraft, wherein the aircraft system uses a first data format and the device uses a second data format, and the method comprises receiving data in a first format from the device and, in response, outputting data in the second format to the aircraft system and/or receiving data in the second format from the device and, in response, outputting data in the first format to the aircraft system.

The method may comprise communicating wirelessly between the aircraft system and the device.

The method may comprise converting data between the first format and the second format, and the output data may comprise the received data converted between the first format and the second format.

The aircraft system comprises an aircraft cabin management system.

The at least one device may comprise a user device, for example at least one of an at-seat user terminal, or an at-seat user input-device, or a portable electronic device, for example a mobile telephone, portable computer, or a portable entertainment system.

The received data may comprise an instruction from one of the aircraft system and the device, the method may comprise converting the instruction into a corresponding instruction that is actionable by the other of the aircraft system and the device, and the output data may comprise the corresponding instruction.

The first format may comprise a first message format, a first communications protocol or a first instruction set, and the second format may comprise a second, different message format, a second, different communications protocol or a second, different instruction set.

The first format may comprise a serial communication protocol and the second format may comprise a wireless communication protocol.

The method may comprise selecting the first format from a plurality of first formats and/or for selecting the second format from a plurality of second formats.

The device may comprise a component of an aircraft content distribution system, for example a user terminal, the received data may comprise a trigger signal from a or the cabin management system, and the output data may comprise a control signal.

The trigger signal may be representative of a state of the cabin management system. The trigger signal may be representative of the activation or deactivation of an intercom system.

The method may comprise monitoring the state of the aircraft content distribution system and providing a control signal to the cabin management system in response to detection of a predetermined state of the aircraft content management system.

The predetermined state of the aircraft content management system may comprise the transmission of forced video output, for example a safety message, by the content management system.

The control signal may comprise an instruction to activate or deactivate an aircraft intercom system.

The method may comprise applying a security protocol to communications from the device. The method may comprise applying the security protocol to exclude access of the device to at least some functions of the aircraft cabin management system.

The method may comprise connecting the cabin management system and/or the wireless interface device to an aircraft flight management system, and applying a security protocol to exclude the device from interfering with operation the flight management system.

The device may comprise a flight attendant panel (FAP).

The method may comprise downloading interface software to the device, the interface software being executable to provide a user input interface for inputting instructions for transmission to the aircraft system via the interface apparatus.

In a further independent aspect of the invention there is provided a computer program product comprising computer readable instructions that are executable by a computer to perform a method as claimed or described herein.

There may also be provided an apparatus, system or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which:—

Figure 1:
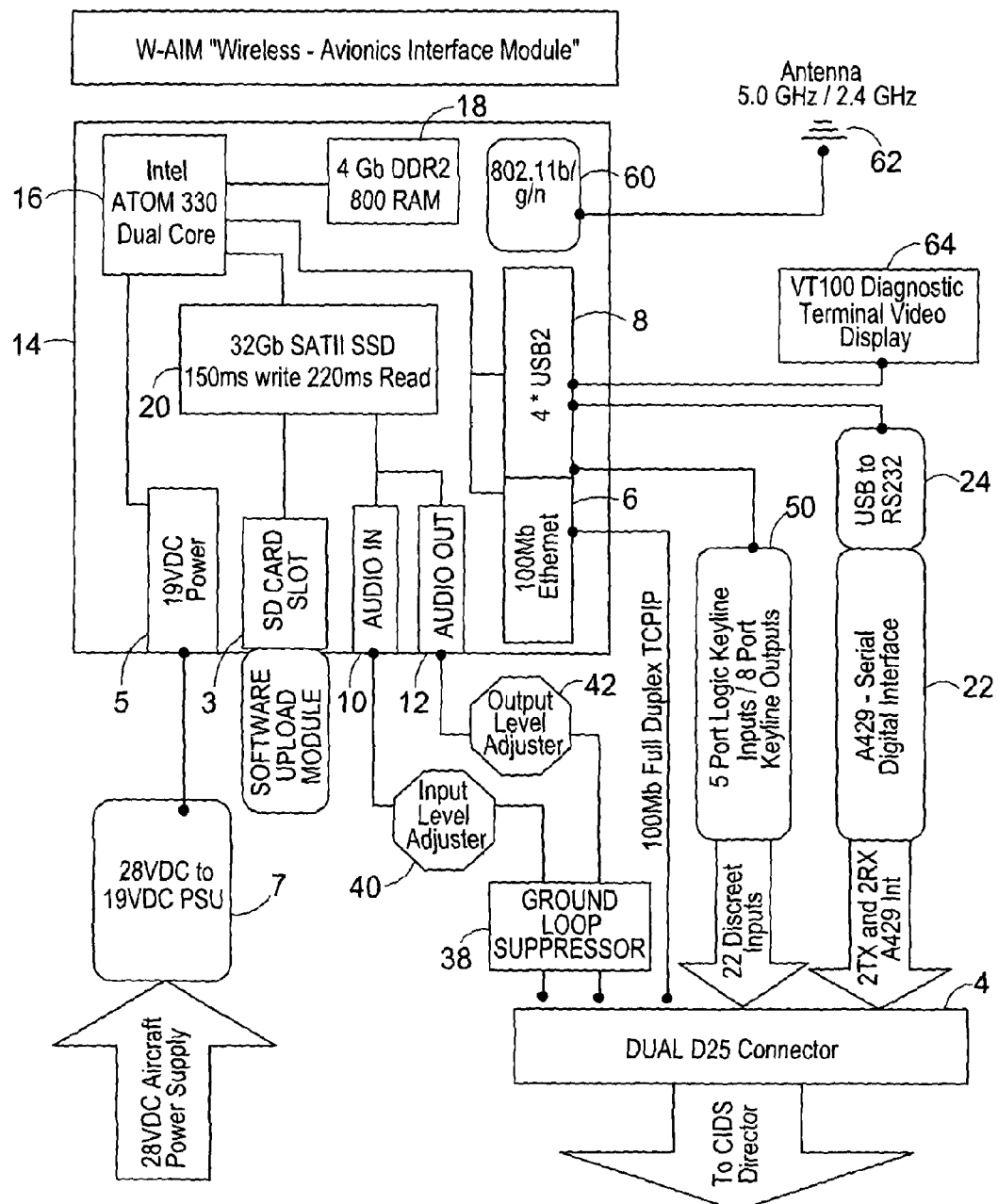
FIG. 1 is a schematic illustration of an embodiment of a wireless interface device.

An interface device 2 according to one embodiment is shown in FIG. 1. As will be described in more detail below, the interface device 2 can be used to provide an interface between two or more distinct aircraft devices or systems, for example between user input devices such as passenger entertainment terminals or control pads and a cabin management system that can be used to control or monitor aspects of cabin functions or environment, for example call bells, cabin lighting, heating, and ventilation, cabin intercom, emergency and galley systems. The interface device can also be used to provide an interface to further systems, for example flight management systems, in-flight entertainment or other content distribution systems. In the embodiment of FIG. 1, the interface device is a wireless interface device that provides for wireless communication with at least one of the devices or system. As will be described in more detail below the interface device 2 can assist in the integration and co-ordination of operation of the different aircraft systems. Firstly, the structure of the wireless interface device 2 in the embodiment of FIG. 1 is described in more detail.

The interface device of FIG. 1 is able to interface to an aircraft wireless LAN, to the CIDS A429 data bus, and to a range of cabin logic discrete inputs and is operable to run a bespoke software client to decode and manage these interfaces. The device also provides secure client and server software applications to allow wireless clients to send control requests and receive cabin status updates without exposing the A429 control system to any outside third party influences such as hacking or unwanted wireless interference from passenger wireless devices. The interface device of FIG. 1 includes various components comprising COTS equipment generally available in the market to keep cost down and maximise system performance. The term A429 is used interchangeably with Arinc 429 herein.

In the embodiment of FIG. 1, the interface device comprises an SBC (single board computer) with an ATOM 1.6 GHz CPU low voltage low heat CPU core 16 provided on a motherboard 14. The computer has at least 4 Gb of DDR2 RAM 18 and its core operating hard drive is a high speed solid state sata-II drive 20 with not less than 32 Gb of storage. The operating system of the device 2 is a Windows XP embedded operating system. The XP embedded operating system has proven to be a reliable and stable platform on which to build control systems in this context. It provides a small software foot print, acceptable system performance and can be constructed to create a secure single purpose device. In other embodiments any other suitable type of processor, operating system and memory may be used The interface device 2 includes an SD Slot 3 to allow SD cards to be used to hold core application software for the device 2 thus allowing the software to be changed easily. In the embodiment of FIG. 1 the SD cards have a capacity of up to 8 Mb, although larger capacity cards can be used if necessary. The application software is written in .Net2.0.

The interface device 2 has a native voltage of 18 to 20 V DC, supplied via a power input 5, but an aircraft 28V DC native power input can be supported by the device via a power supply unit 7.

The interface device 2 also comprises a dual D25 connector 4 comprising two D25 pin RS232 type connectors 26, 28 for connection to an aircraft cabin management system, for example the Airbus Cabin Intercommunication Data System (CIDS). The connectors 4 are connected to a 100 Mb Ethernet Card 6, four USB 2 cards 8, and audio in 10 and audio out 12 connectors, each of which is provided on the motherboard 14. The use of the dual D25 connector 4 can provide for standardisation of the interface components between the interface device 2 and other aircraft systems, whilst also providing sufficient pins to allow for additional functionality.

One of the connectors 26 of the connector arrangement 4 provides an A429 Serial Digital Interface 22 to the aircraft management system. The serial digital A429 interface 22 provides an RS232 interface that accommodates two transmit and two receive A429 data bus communication pairs at 100 Kbps. As RS232 interfaces are now being phased out on most PC hardware a USB 2 to RS232 module 24 is also inserted between the A429 decoder 22 and the CPU core.

Figure 2A:
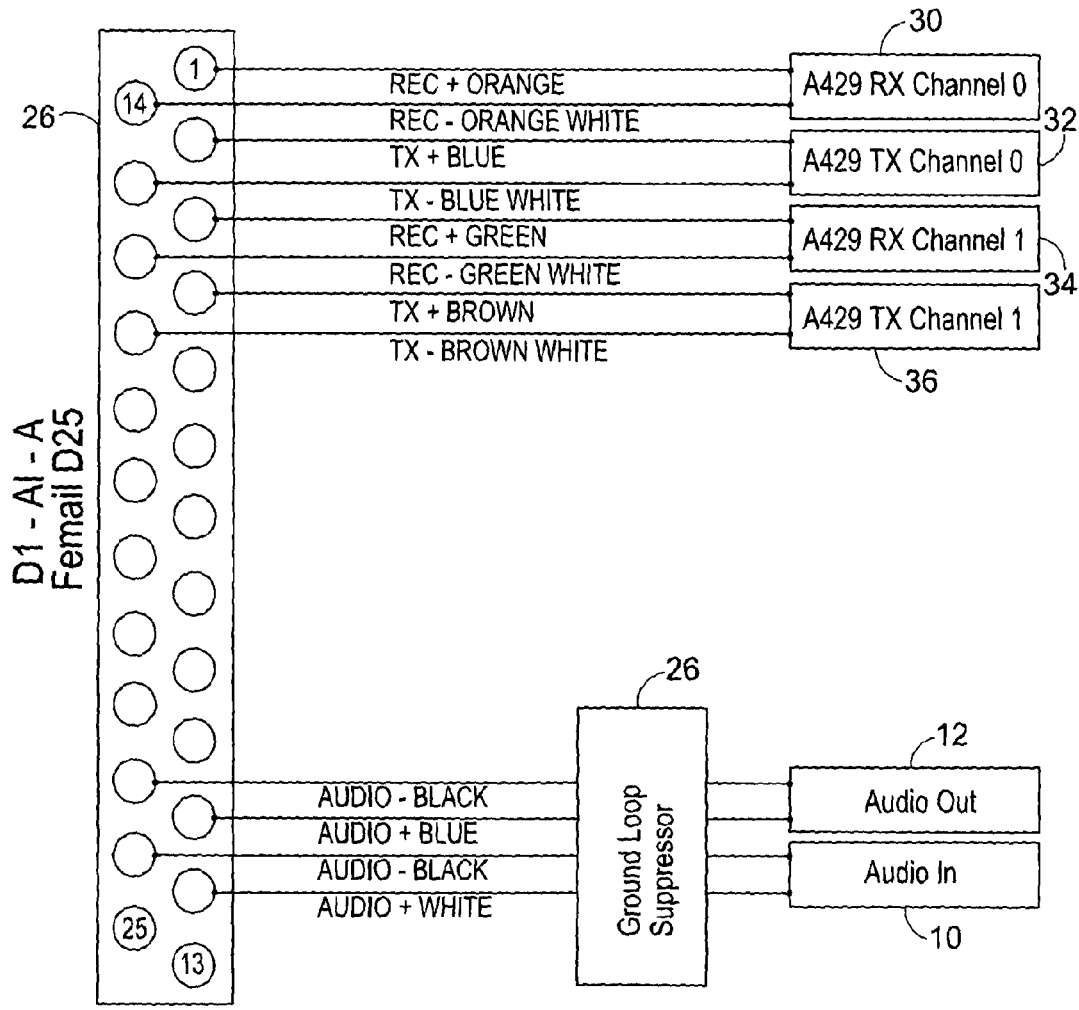
FIGS. 2a and 2b are illustrations of connectors of the wireless interface device of FIG. 1.

The pin arrangements of the connector 26 are illustrated in more detail in FIG. 2a. It can be seen that eight of the pins are arranged to provide four A429 transmit or receive channels 30, 32, 34, 36. Four further pins are connected to the audio in 10 and audio out 12 connectors on the motherboard 14 via a ground loop suppressor 38 and input and output level adjustors 40, 42 (not shown in FIG. 2).

As will be described in more detail below, the audio in 10 can be used to provide an analogue audio feed from an aircraft intercom or public address (PA) system, and the audio out 12 can be used to send audio output (for example audio output from an aircraft content distribution system) to the intercom or PA system.

Figure 2B:
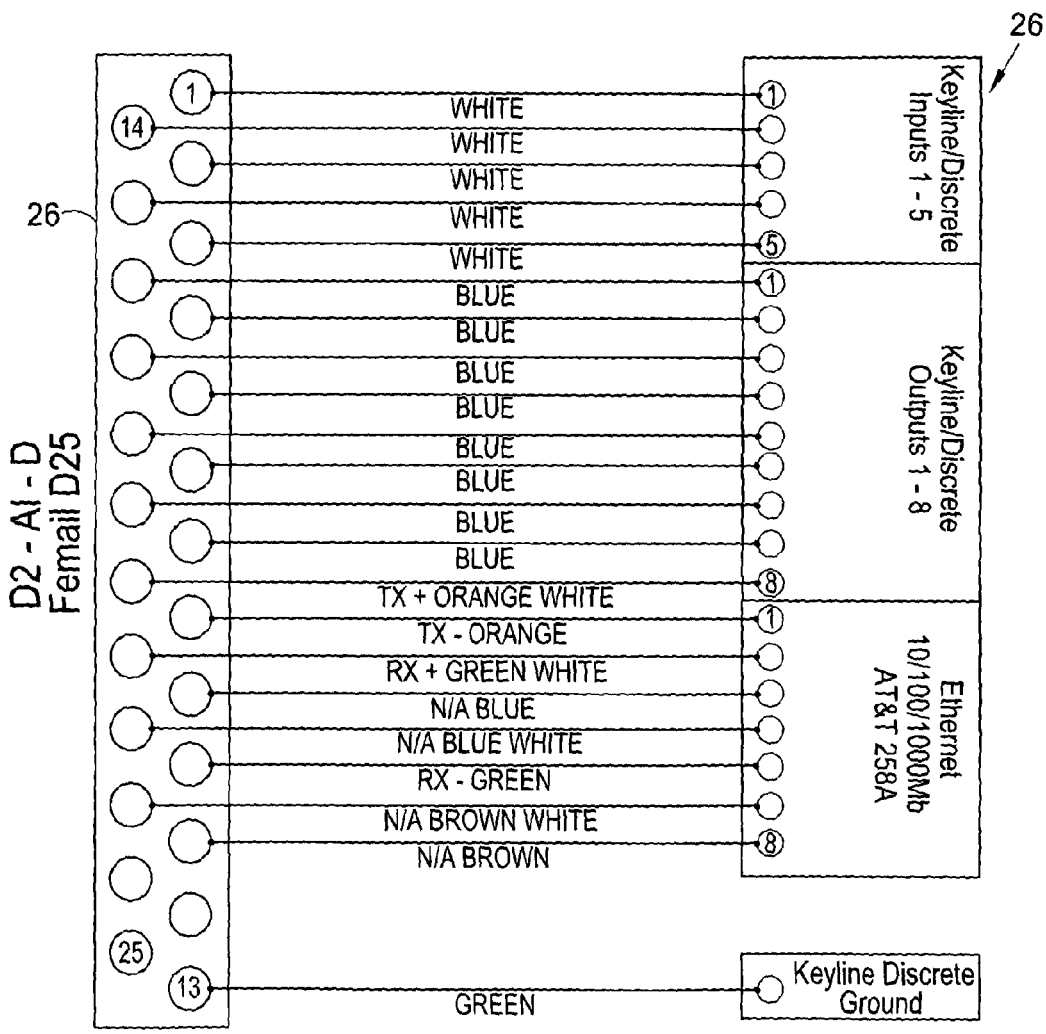

The connector arrangement 4 also comprises a further connector 28, and the pin arrangement of that further connector 28 is illustrated schematically in FIG. 2b. Twenty two pins of the further connector 28 are connected to a discrete logic interface board 50 having 22 logic inputs or outputs and connected to the CPU core via a USB card 8. The discrete logic interface board 50 is used in the detection of discrete logic states of the aircraft cabin management system.

In one mode of operation of the embodiment of FIG. 1 all interfaces to the aircraft cabin management system communicate with the processor core 16 via USB 2. However, a 100 Mb full duplex Ethernet interface is also provided by the Ethernet card 6 for future connection to aircraft wired networks, for example the ARINC A429/629 over Ethernet interfaces being proposed for A350 and B787 aircraft.

As well as the interfaces to an aircraft cabin management system, the interface device also provides a wireless interface to various user devices via a USB Wireless Module 60. The USB wireless module 60 supports 5.0 GHz and 2.4 GHz 802.11 b/g WLAN protocols and provides an external high-gain antenna 62 to maximise wireless signal quality and discrete cabin interior installation.

A VT100 USB integral display 64 is included with the interface device 2 to provide a visual for system status and diagnostics. In the embodiment of FIG. 1 the display 64 is the primary output device, as such the application software of the device 2 uses the integral display 64 rather than standard video output for visual outputs (although the standard video output can be used in other modes of operation).

The interface device 2 also includes an analogue channel that provides two channels of analogue input/output, which can be used for various applications, for example remote variable input/output level adjustment.

Figure 3A:
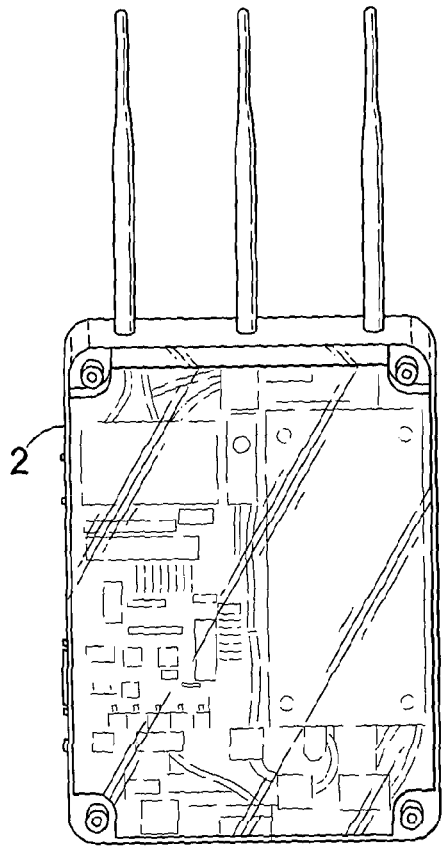
FIGS. 3a and 3b are photographs of the embodiment of FIGS. 1 and 2.
Figure 3B:
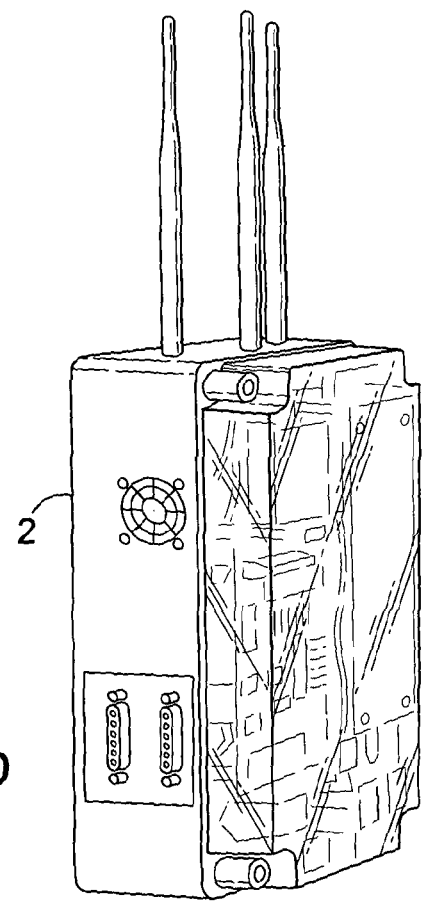

The interface device 2 of FIGS. 1 and 2 is provided in a single housing, as shown in FIGS. 3a and 3b. By providing the device 2 in a single housing, it can potentially be avionics certified as a single device. The housing comprises a device enclosure constructed from high grade aluminium.

Figure 4:
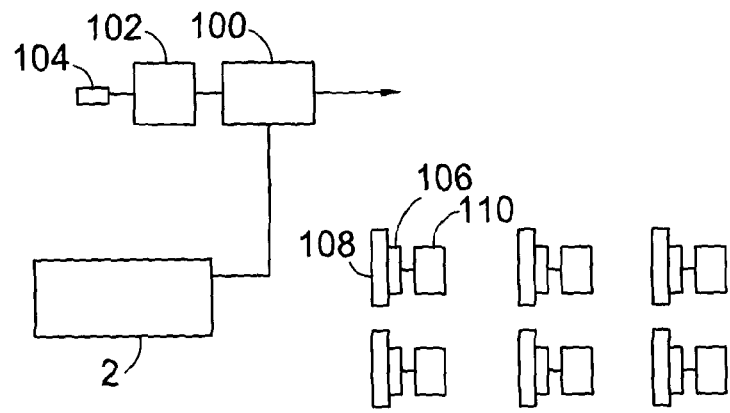
FIG. 4 is a schematic illustration of an embodiment of a cabin management system including the wireless interface device of FIG. 1.
Figure 4:
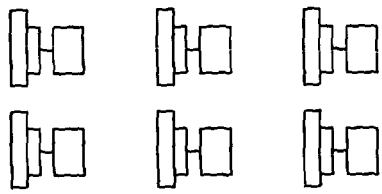

In operation, the wireless interface device 2 can be used to provide an interface between user devices and the cabin management system, as illustrated schematically according to one embodiment of a cabin control system in FIG. 4.

In the embodiment of FIG. 4 the dual D25 connector 4 of the wireless interface device 2 is connected via RS232 cabling to RS232 connectors of an aircraft cabin management system control unit 100. The aircraft cabin management system control unit 100 is linked to a flight attendant panel 102 that provides controls enabling flight attendants to control various aspects of the cabin environment and passenger services via the aircraft cabin management control unit 100. The flight attendant panel 102 can comprise a set of manual switches or buttons, or can comprise a display and associated PC or other processing device.

The aircraft cabin management system control unit 100 is connected, for example, via wired connections to overhead passenger service units above each seat that provide overseat lighting, ventilation and flight attendant call facilities; to main and emergency cabin lighting; to main cabin ventilation systems; to the cabin intercom system; to emergency systems and to galley systems. Any of those components may be controlled or monitored from the flight attendant panel 102. The flight attendant panel 102 also comprises a microphone 104 into which the crew can speak to deliver audio messages via the cabin intercom system.

Passenger seats 108 are shown schematically in FIG. 4. A display 106 installed in the back of each passenger seat 108 of the aircraft. Each display 106 is connected to a client device 110 that may be used to control operation and streaming of in-flight entertainment and other content to the display 106. The client device may be connected to a user input device (not shown) that can, for example, be stowed in the arm rest of the seat and can provide user control of operation of the client device and display, and the selection and viewing of content by the user. The display 106 may include a touch-screen and in that case user control may be provided by interlinked menus and soft buttons displayed on the touch-screen.

In the embodiment of FIG. 1, the display 106 is detachably housed in a screen mount on the seat back and includes a power connector that allows it to draw power from a pre-existing in-seat power supply. The client device 110 is also connected to the pre-existing power supply.

The client device 110 includes a processor 130, memory 132 for storage of content, and a communications interface 134 for communication with a content server 2 via a wired or wireless LAN. The wireless interface may comprise for example a USB wireless module supporting 5.0 GHz and/or 2.4 GHz 802.11b/g WLAN protocols.

Each client device 110 can be used to provide in-flight entertainment or other content to a passenger. It is a feature of the system of FIG. 4 that the client device 110 can also be used to communicate with the aircraft cabin management system via the wireless interface device 2.

The client device 110 is programmed to display, in operation, a user interface menu on display 106 that enables the user to select content for viewing and to select other functions. The user interface menu provides, according to known GUI techniques, selectable features that allow the user to select features of the cabin environment (for example lighting level, ventilation level). The processor is configured to transmit messages to the wireless interface device 2 via the communications interface 134 in response to input by a user. The GUI for cabin and call bell buttons is provided to the client devices 110 by the application software of the interface device, via wireless communication with the client devices 110.

Figure 5:
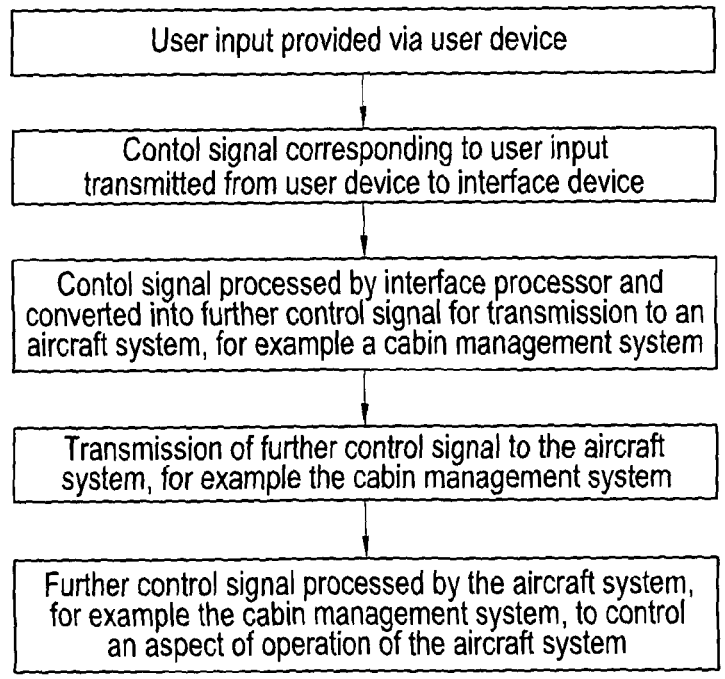
FIG. 5 is a flow chart illustrating in overview one mode of operation of the system of FIG. 4.

The interface device 2 resides on a passenger wireless TCP/IP network and protects the avionics from unwanted external influence using an SSL/TLS (Secure Socket Layer/Transport Layer Security) interface layer. Only the client device 110 have a valid SSL certificate to send and receive data to and from the interface device 2 ensuring that no third-party device can influence any of the cabin controls. Operation of the system to control aspects of the cabin environment is illustrated in overview in FIG. 5.

A message from the client device is received at the wireless interface device 2 by the wireless module 60 and passed to the processor 16 for processing. The processor 16 translates the message into a corresponding data word or words under the A429 protocol or into a corresponding discrete output and passes the data word or words or the discrete output to the appropriate pins on the dual D24 connector 4 for input to the cabin management system 100. The aircraft cabin management system then performs actions corresponding to the input data word or words or the discrete output.

The processor 16 in operation runs software that performs the translation. In the embodiment of FIG. 1 the software comprises a dynamic linked library (DLL). The DLL contains software objects that represent the commands available on the ARINC 429 interface. The DLL objects in the embodiment of FIG. 1 can be accessed by any software developed under .Net 2.0. The DLL objects enable commands to be translated and passed to the aircraft cabin management system (in this example) or other aircraft system and can be accessed by other software routines running at the processor 16. The DLL of the embodiment of FIG. 1 is referred to herein as the Arinc429Comm software component. It will be understood that any other suitable software component or combination of software and/or hardware components can be used to provide the desired functionality.

Examples of objects provided by the Arinc429Comm component in the embodiment of FIG. 1 include the following:

a. An object (PaxOperationalServiceCommand1) that contains data for seat row, seat identifier (A, B, C etc), reading light toggle, call bell activate, and call bell reset.

b. An object (PaxOperationalServiceCommand2) contains data for seat row seat identifier, and reading light dimming commands.

c. An object (PaxCallBellZoneReset) that contains data to identify a zone on the aircraft (Deck, Zone or Room number) on which to reset the active call bells.

Each command object itself contains algorithms to create a 32 bit binary data word in the format expected by the aircraft system (in this example the aircraft cabin management system) which encapsulates the data fields set by the calling application. For example, for PaxOperationalServiceCommand1 to activate the call bell, bit 11 is set to true.

For data to be read from the aircraft systems the software contains a database of binary A429 commands. Each A429 command is a 32 bit word. Specific bits of the data word identify the function and other parameters of the command or status word. ARINC words read from the aircraft system are compared against the database of known words to identify the type and parameters of the word. The software then parses the word to extract any required data.

A further object (PES_StatusBroadcast) maintains a constant broadcast of system status information that is required by the aircraft system. This software component broadcasts a block of seven data words separated by 100 milliseconds and repeat the block every 2500 milliseconds.

Another object (PES_StateController) maintains a finite state machine in response to data received from the aircraft systems. The object governs the current operational mode of the Inflight Entertainment System. The mode determines the availability of certain commands on the aircraft interface. The mode also allows data exchange (handshake) between the IFE system and the aircraft system.

The software contains an interface module for each supported airframe/avionics type. For interoperability between airframes/avionics the software implements a baseline set of commands available on all aircraft types. For advanced commands (e.g. light dimming, or zone bell reset) the software allows the calling application to query on availability of supported commands.

This architecture allows the same software component to be used on all airframes, with the appropriate conversion routines selected during configuration, or even dynamically at runtime.

Turning to a specific example, a passenger may instruct the lighting for his or her seat to be switched off by sending a message from the client device via the interface device 2. The message sent from the client device to the interface device 2 includes an instruction to turn off the lighting and a seat identifier. The processor 16 converts the received instruction into data words under the A429 protocol that identify the seat and include an instruction to turn off the lighting for that seat. The data words are passed to the aircraft cabin management system 100 via an appropriate transmit channel 32. The aircraft cabin management system 100 processes the received data words in accordance with the A429 protocol and switches off the lighting to the identified seat.

Although the example of the preceding paragraph relates to the control of lighting to a particular seat, any function of the cabin management system that can be controlled or accessed using the A429 protocol or discrete inputs or outputs can be controlled or accessed via the wireless interface device 2. For example, call bell activation or deactivation by a passenger or flight attendant, or cabin PA volume, can be instructed via messages sent to the cabin management system control unit 100 from the client device 110 or other user input device.

As well as controlling aspects of the cabin environment the wireless interface device can obtain and forward data from the cabin management system, for example in response to user or client device requests. In the example of FIG. 4, data words representative of, for example, cabin temperature, humidity or cabin lighting levels can be sent to the wireless interface device 2, for example in response to a request from the wireless interface device 2. The data words can be converted by the processor 16 to be in any desired format and forwarded to further devices, such as the client devices 110. The data representative of for example cabin temperature, humidity or cabin lighting levels or other environmental or journey conditions can then be displayed on the user's displays 106 if desired.

In the embodiment of FIG. 1, user input is provided via a user interface of a client device 110 used to provide in-flight entertainment or other content to a passenger. Any other suitable arrangement for providing user input to or via the interface device 2 can be used, for example a user control device comprising buttons, sliders, control wheels or any other mechanical or electromechanical user input device can be used. Such devices may comprise wireless interfaces for transmitting data representative of the user input to the interface device 2. Alternatively or additionally the user input devices may be connected to a wired network, for example an Ethernet network, for transmitting to or receiving data from the interface device 2.

In some embodiments, the user input devices can be user input devices brought on to the aircraft by the passengers, for example portable computers, PDAs, mobile phones or games consoles. In such embodiments, the interface device 2 is operable during its start-up procedure to determine the presence of any suitable wirelessly-enabled devices and to download interface application software to each device. The interface application software is executable by the user devices to provide a graphical user interface for input of user instructions for transmission to the cabin management system or other aircraft system via the interface device 2.

Although the interface device 2 in embodiment of FIGS. 1 and 4 is described as being configured for connection to an A429 interface for interfacing between the Airbus CIDS system and the client devices 110, the interface device 2 can be configured to interface between any other cabin management systems and other user devices, each of which can use any desired data format, for example any message format, communications protocol or instruction set. For example, the Arinc 628 part 3 format is used in Boeing 777 and 747 aircraft, and the RS485 serial bus for Rockwell Collins AIS-2000 IFE interface protocol.

In the embodiment of FIG. 1 the SD card storing the application software also stores different message formats, communications protocols and instruction sets for different cabin management systems and different user input device, and also stores executable software for conversion between the different formats. During set-up of the interface in a particular aircraft, an operator can select, using a selection module included in the application software, different formats depending on the properties of the cabin management system and the user input devices.

In many existing aircraft, the cabin management system is hard wired to user input devices at passenger seats. In certain embodiments the interface device 2 is retrofitted to such existing aircraft by disconnecting the existing user input devices from the cabin management system control unit and connecting the wireless interface device 2. Any suitable wireless user input devices can then be used to access the passenger management system via the interface device 2.

In some know aircraft systems the cabin management system is interfaced to the aircraft's flight management system (FMS) and can receive flight and other data from the FMS. In the embodiment of FIG. 1, the wireless interface device 2 has been designed with two transmit and receive A429 pairs for redundancy, and one of these pairs can be used to receive FMS flight position and flight progress data for use by the client devices 110 for local moving map and flight following purposes.

Figure 6:
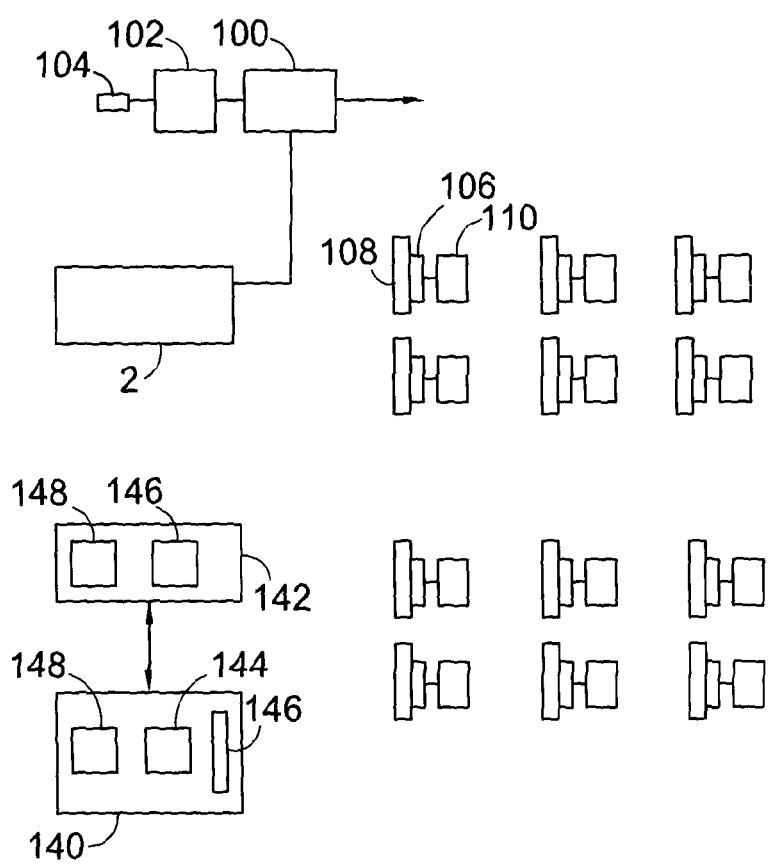
FIG. 6 is a schematic illustration of a cabin management system and an in-flight entertainment system in another embodiment.

As well as interfacing with client devices, a cabin management system and, either directly or indirectly, a flight management system (FMS) the wireless interface device 2 can also interface with an aircraft content distribution system server, as illustrated schematically in FIG. 6.

The system of FIG. 6 includes an aircraft content distribution system that is the subject of the applicant's co-pending UK Patent Application No. 0908038.3, which is hereby incorporated by reference. The aircraft content distribution system comprises a content server 140 and a content management terminal (CMT) 142.

The aircraft content distribution system of FIG. 6 is a semi-embedded alternative to the traditional and expensive OEM fitted in-flight entertainment systems. However, for the content distribution system shown in FIG. 6 to become a fully embedded solution and become an OEM fitted option it may be desirable to overcome its inability, when considered alone, to interface to the cabin PSS/CIDS systems to control cabin lighting, call bells and be aware of many mandatory cabin safety conditions. The use of the interface device 2 addresses that issue, and can allow passenger devices to be able via their onboard software to wirelessly control passenger cabin lighting and activate the cabin call bell as well as being able to detect cabin status discrete logic states such as PA in progress, cabin evacuation, cabin decompression etc.

The server 140 of the aircraft content distribution system of FIG. 6 comprises a control processor 144, a data store 146 for storing content and a communications interface 148 for communication with the client devices 110 via a wired or wireless LAN. The data store 146 stores items of content (which may also be referred to as media items) such as films, TV programmes, safety videos, music, games or other software, synopsis data and preview clips for distribution to the client devices 10 and subsequent streaming to the displays 6 for viewing or listening by users. The communications interface comprises an 802.11b/g interface.

The CMT 142 includes a processor 146 and a touch-screen display 148. The CMT 142 is linked to the content server 140 and provides a control interface enabling the crew or other airline personnel to control operation of aspects of the content distribution system. The processor 146 includes an operating system and executable software that provides control and maintenance functions, including control of content and software upload to the content server 140, control of distribution of content or software to the client devices 10, and configuration management. Other examples of functions provided by control of the CMT include fault and status checking of the content distribution system, entry of flight information for distribution to and display by the client devices 110 and displays 106, and control of streaming of the safety demonstration video to the client devices 110.

The CMT software may be customized to suit the requirements of any particular aircraft installation.

In certain embodiments, the components of the content distribution system are primarily commercial off-the-shelf components, suitably programmed or otherwise configured. The content distribution may thus be classified for use in-flight with reduced certification requirements. For example, if classified as a Class 2 system, it may require only an STC and not OEM certification, meaning that certification time is reduced from years to months. The content distribution system may also be installed on a stand-alone basis, for example so as to not affect operation of, or without being integrated with, passenger service systems or other aircraft systems, which can reduce installation and maintenance requirements.

The display 106 in the embodiments of FIGS. 4 and 6 is a 7", 16:9 ratio active matrix TFT (800×480) wide screen, which can include Splendid Video Intelligence Technology. The display 106 is linked to the client device 110 via a standard VGQA or HDi interface cable. An additional screen can be linked to the client device 110 via the interface cable as well as or instead of the display 6. The client device 110 can deliver a HD quality 1600×900 32 Bit colour video resolution and can support video output to screen sizes up to 50".

In the embodiment of FIG. 1, the processor of the client device 110 is an Intel® ULV Celeron® 900 MHz M Processor with the Intel®910GML chip set, on which is installed the Microsoft XPe (embedded) operating system, which provides a small footprint, fast loading operating system that can be tailored to specific applications providing a stable and secure operating platform. The following applications and frameworks are integrated into the XPe image: Windows DotNet 1.1 SP1, Windows Media Player 10, Disk Encryption software, and video codecs for digital media. It can be understood that the client device may be a PC-type device, for example an ultra-mobile PC (UMPC).

The processor includes application software developed under the Microsoft .Net platform using the C# language. The software runs on top of the secure Windows XPe OS, and use the Windows Media Player 10 component to handle all media playback and Windows Digital Rights Management for securing video and audio content. The application software manages a local database that is used to retain the menu/navigation hierarchy, location paths and usage statistics of all items of content that are stored in the content memory 32.

The application software includes a download management module 38 for managing the download and storage of content at the client device 10, and a content and display management module 36 for managing the selection and playback of items of content stored at the client device 10 and operation of the display 6.

Playback of audio & video content is managed by the Microsoft Windows Media Player 10 ActiveX component, under control of the content and display management module 36. That provides fully supported playback and license acquisition of Microsoft DRM protected WMV and WMA content, support for the playback of mixed language tracks, enabling the user to toggle-select between multiple languages whenever the current film supports it (the media player always start a film with the default language), the playback of subtitled films and CC versioning, support for the use and installation of multiple codecs allowing any existing and future media files and DRM enhancements to be supported, and support for Windows updates, keeping the Microsoft platform and DRM facility secured and fully patched.

The memory of the client device 110 for storage of content comprises two external USB2 hard-disks, which are physically secured to the seat in an enclosed layer, and provide a capacity of 320 Gb of encrypted media content space of (based on available 5200 rpm 3.5" disk technology). In the alternative, portable embodiment the memory 32 comprises a 6 0Gb hard drive. The client device 110 also includes 256 MB DDR 533 MHz, and a SODIMM socket enabling memory expansion up to 768 MB DDRII-667 DRAM.

The communications interface of the client device 110 is an integrated 802.11b/g interface, which enables communication with a wireless LAN operated by the content server 140. An on-board 10/100 LAN interface may also be provided to provide wired LAN functionality.

The client device 110 also includes an Intel® GMA 900 video graphics processor, which supports resolutions up to 1600×900, a push/pull type SD card slot, and various additional inputs and outputs, including an R2H Port Bar connector for external hub (S/PDIF, VGA, DC-in, 3 USB, LAN), VGA function support via VGA Cabling, two USB 2.0A ports, one mini-USB2.0A port, a microphone socket, a headphone socket, a built-in mono speaker, an audio/video (AV) output and a RJ45 LAN port.

The client device 110 includes a 12V-35V DC power input for connection to the in-seat power supply, and a 12V DC, 3 A, 36 W power output.

The processor 144 of the content server 140 includes installed application software that comprises a control module, a batch content loader (BCL) and an SQL server module. The SQL server module comprises a database of all items of content stored on the content server data store 146 and on the client devices 110, and their locations. The batch content loader, in combination with the control module and communications interface 148 make up a distribution subsystem that provides means for distributing content to the client devices 110. Other components or combinations of components may make up the distribution sub-system, providing a means for distributing content, in alternative embodiments. For example, the distribution sub-system may comprise a dedicated distribution module within or separate from the processor 144.

In operation, the content server is used to distribute items of the content and to store them locally at the client devices 110. Selected items of content can then be played back from the data stores at the client devices. Thus, data does not to be streamed in real time from the content server 140 to the client devices 110.

It is a feature of aircraft systems that playing of content at user devices may need to be co-ordinated or interrupted simultaneously at each user device, for example for simultaneous playing of a safety or other message at each device or to enable a PA message to be heard by all passengers. In known systems in which content is streamed to each device from a server it is straightforward to co-ordinate playing or interruption of content at different user devices. However, in the system of FIG. 6 content is stored locally and played back independently by each user device making co-ordination more difficult. The wireless interface device 2 in the embodiment of FIG. 6 can provide for co-ordinated interruption of content playback, even for locally stored and played content, as now described in more detail.

In the embodiment of FIG. 6, the further RS232-type connector 28 is connected to the aircraft cabin management system control unit 100 such that in operation a discrete logic signal representative of activation or deactivation of the intercom system is provided to the processor 16 via the connector 28 and the discrete logic interface board 50. The application software running at the processor 16 responds to a signal indicating that the intercom system has been activated by transmitting a Pause On/Off state command to the client devices 110 as described above. The playing of content by the client devices 110 is paused in response to the Pause On/Off state command, allowing passengers to listen to the intercom system. The signal monitoring device detects when the intercom system is subsequently deactivated or the delivery of the message has ended, and transmits a further Pause On/Off state command to instruct the client devices 110 to resume playing content.

In alternative modes of operation, the processor 16 can transmit other commands to the client devices 110 in response to the intercom activation or deactivation signal. For example, the processor 16 can transmit commands turning the audio volume down for each client device, thus allowing the intercom to be heard by the passengers.

In other modes of operation, the processor 16 can monitor other states of the cabin management system, for example:—
  a) Cabin Illumination Status (for example, to detect night mode or low illumination states, and in response to dim IFE screens)
  b) Cabin Alert Status (to detect safety announcements, or evacuation command)
  c) Cabin Signs Status (for example, to detect fasten seatbelt sign, return to seat, no smoking and no Electronic Device signs and in response to display alerts on IFE screens)
  d) PA announcement source (for example, to detect which channels are being broadcast over PA so they can be relayed over user headphones)
  e) Cabin theme music scenario (and for example to display welcome video during boarding in response)

Each of the listed features a) to e) are configurable according to airline or regulatory requirements and may be switched off, on, or on but with some features disabled.

Figure 7:
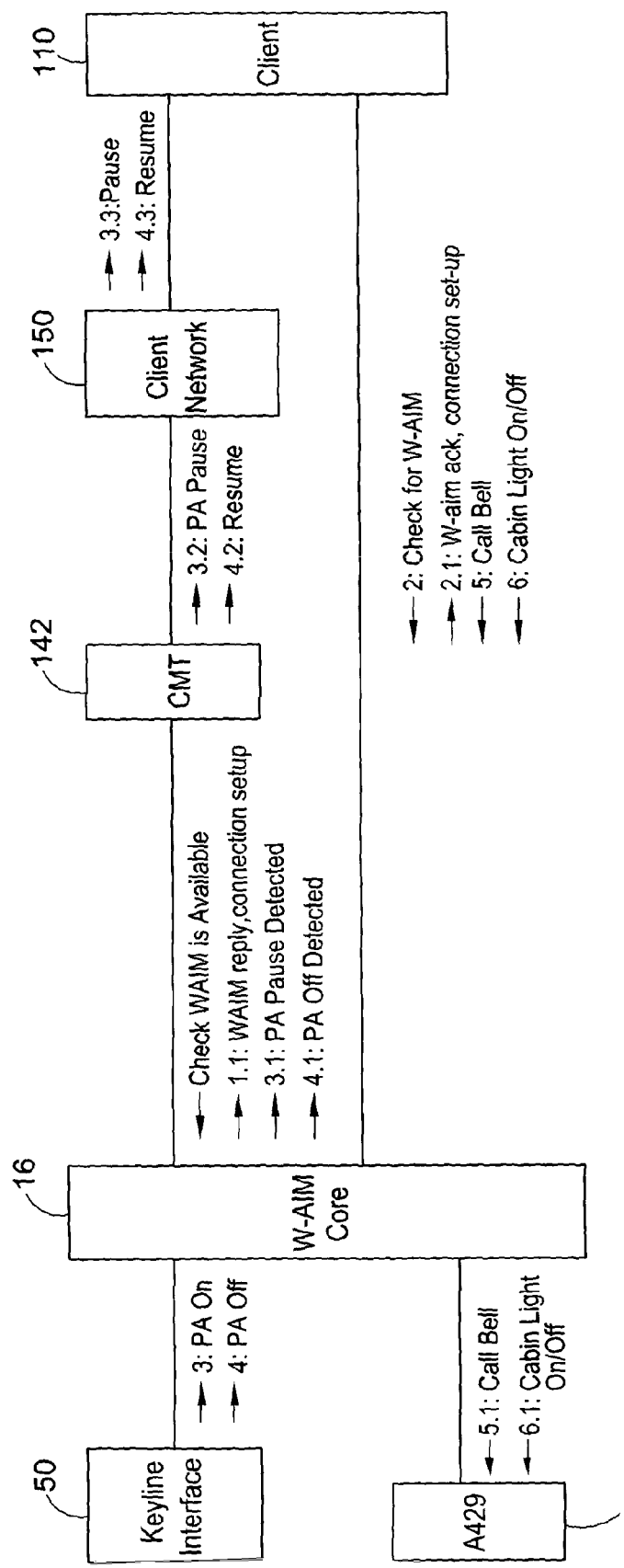
FIG. 7 is a flow diagram illustrating in overview communication between various components of the system of FIG. 6.

In one configuration of the embodiment of FIG. 6, the interface device is also interfaced to the CMT 142 of the content distribution system in either a wired or wireless fashion and can transmit messages to or receive messages from the CMT 142. Communication with the CMT 142 is also subject to SSL security. A flow diagram illustrating in overview communication between the processor 16 of the interface device 2, the keyline interface 50 and A429 interface 30, 32, 34, 36, the CMT 142, and the client devices 110 via a wireless network 150 is illustrated in overview in FIG. 7. The interface device 2 can connect to the CMT 142 and clients 110 over secure TCP connections.

A user interface of the CMT 142 includes a diagnostics/engineering view of the interface device 2 enabling set-up and monitoring of operation of the interface device 2. The user interface of the CMT 142 also includes controls to adjust intercom system volume up and down by sending control signals to the cabin management system control unit 100 via the interface device 2.

The CMT 142 looks for the wireless interface device 2 upon start up by sending out a ping or by attempting to open up a socket connection to the fixed IP address of the interface device 2. If the CMT 142 receives no reply from the interface device 2, an error message is displayed on the CMT 142 and it will not function; there will be an option for the user to retry.

If the CMT 142 receives a reply from the interface device 2 a TCP connection between them is set-up over SSL and the CMT 142 continues to boot onto its main application interface.

The client devices 110 will also look for and connect the interface device 2 via TCP over SSL upon start up. The client device 110 will still function, and will be able to receive, store and playback content, without a connection to the interface device 2 but will not have features dependent on connection to the interface device 2 such as enablement of cabin light and call bell buttons.

In operation of the embodiment of FIG. 6, the client devices 110 can send call bell requests to the interface device. Each request is processed by the core processor 16 which sends the request to the A429 module. The request contains two parameters:
  Message Type i.e. Call Bell On
  Seat Number In the embodiment of FIG. 6, the interface device 2 acts as the communications gateway between the CMT 142 and the cabin management system. The interface device 2 is configured to provide the CMT 142 with cabin state triggers that are relevant for content distribution, such as the discrete logic signal (referred to as PA on/off) representative of the activation or deactivation of the intercom system discussed above. The core processor 16 of the interface device 2 receives PA on/off signals from the KeyLine interface, and notifies the CMT 142. In response the CMT 142 sends out the appropriate Pause or Resume commands to the clients.

The interface device can also receive data from the CMT 142 that can be indicative of the state of the content distribution system and that may be relevant to operation of cabin management functions. For example, in one configuration, the application software of the interface device 2 includes a version of the application software of the client devices 110 that enables it to detect when the CMT 142 or server 140 is providing forced streaming video output to the client devices 110 (for example a safety video that is streamed in real time from the server 140 to the client devices rather than being stored and played back from the local storage devices 132). In response to detection of the forced streaming video output, the interface device 2 sends a signal to the cabin management system control unit 100 to activate the intercom system and subsequently provides the streamed audio feed from the forced video to the cabin management system control unit 100 to be output over the intercom. Thus, audio output over the intercom system can be synchronised with the output of streaming video by the content distribution system.

In the embodiment of FIG. 6, the CMT 142 also provides a heartbeat function checking periodically that the interface device 2 is available and operating normally. In response to detection of abnormal operation the CMT 142 signals the clients to change to a pre-defined state. In this configuration the CMT 142 can also operate as a control console for the interface device 2 via an HTML console displayed on its control screen and provides an MTSC terminal connection for engineering use.

As well as providing a wireless interface to an in-flight entertainment system and to a flight management system, the interface device 2 can also provide a wireless interface to the flight attendant panel 104, if the flight attendant panel includes suitable wireless communication hardware and/or software, for example a wireless module including an antenna and supporting 5.0 GHz and 2.4 GHz 802.11 b/g WLAN protocols.

In another embodiment, the wireless interface 2 hosts the CMT application software as will as CIDS (or other cabin management system) control functions. The device 2 can also provide a secure HTML console over Ethernet that could be displayed on the flight attendant panel (FAP). Thus a fully integrated IFE system requiring no additional cabin equipment could be provided.

Figure 8:
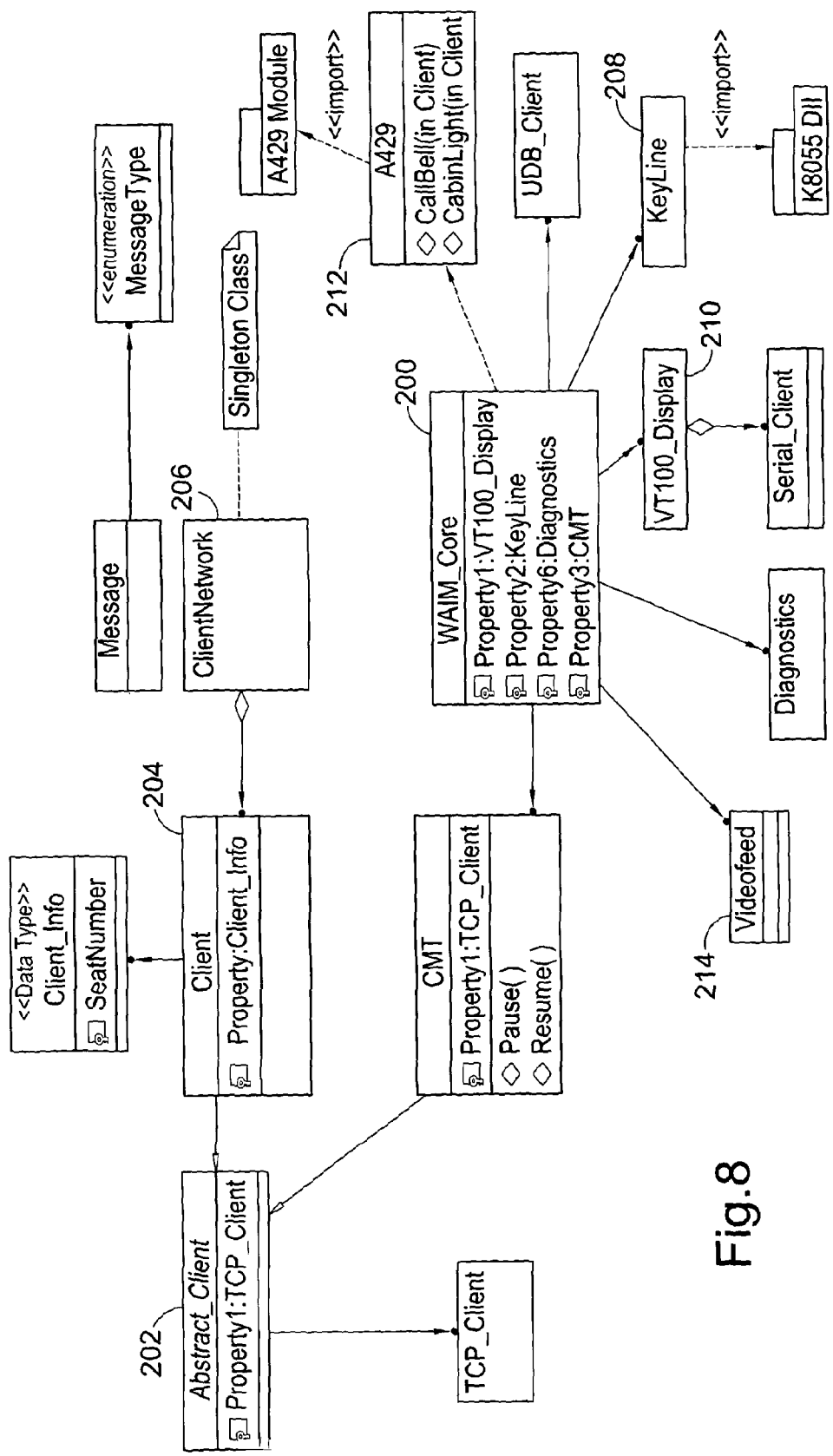
FIG. 8 is a core class diagram for the application software of the wireless interface device.

The application software of the wireless interface device 2 can be implemented using any suitable programming language and in any suitable design to provide the described functions. The software design of the application software of the interface device 2 of FIG. 6 is implemented in an object oriented programming language, in this case C# (.Net framework 2.0) and is illustrated in overview in FIG. 8, which is a core class diagram for the application software.

The core classes include the following: WAIM_Core 200, Abstract_Client 202, Client 204, ClientNetwork 206, KeyLine 208, VT100_Display 210, A429 212, and VideoFeed 214. The core classes provide the following listed properties or functions in addition to those that have already been described:

WAIM_Core
  Entry point to application; may be a service.
  Instantiates ClientNetwork collection, A429, KeyLine, VT100_Display objects on initialisation.
  CMT object instantiated on connection to the CMT—may be singleton class.
  A new Client object is added to ClientNetwork collection on new client connection.
Abstract_Client
  Contains a TCP_Client object.
CMT
  Extends Abstract_Client.
  Send messages to CMT over TCP.
  Pause
  Resume
Client
  Extends Abstract Client.
  Send/receives messages to/from individual clients over TCP.
  Call bell requests.
  Cabin light on/off requests.
ClientNetwork
  Collection of client objects.
  Singleton class.
KeyLine
  Keyline board logic layer.
  Imports Keyline API dll.
  Contains methods for setting outputs and fires events when input is detected.
VT100_Display
  Sends text to VT100 display over a serial port.
A429
  Layer for sending messages to A429 module.
  Receives acknowledgements from A429 module.
VideoFeed
  Receives audio from the CMT video stream and outputs to audio card.

The software running on the core processor 16 implements the Arinc429Comm library of functions, which is used to monitor and process communication with the aircraft cabin management system (in this case, a CIDS system) via the A429 interface.

The Arinc429Comm library maintains a finite state machine model to implement a desired state transition diagram for the passenger entertainment system. The Arinc429Comm also maintains a persistent datastore of all monitored 429 interface labels and parameters extracted from those labels.

Figure 9:
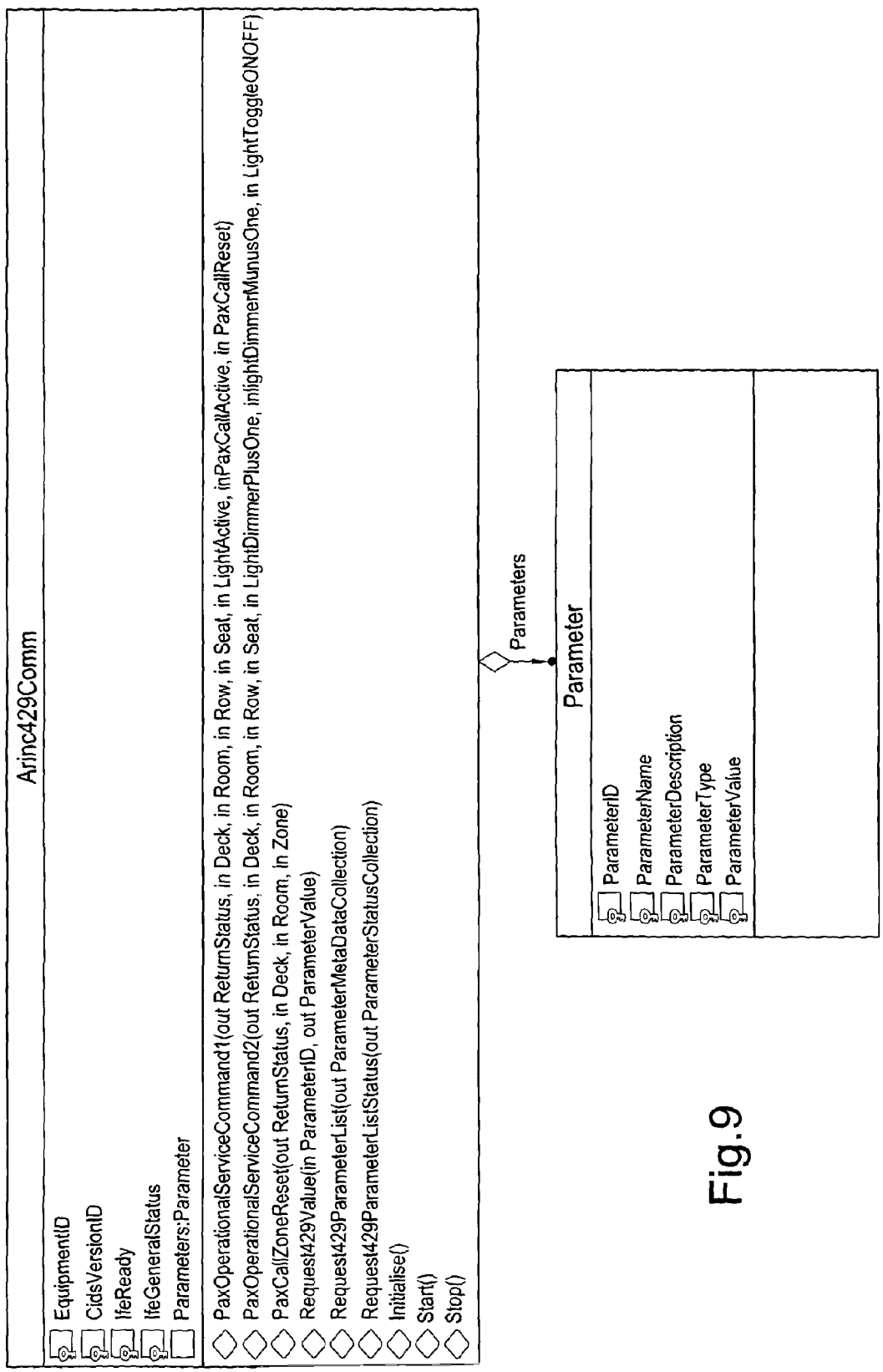
FIG. 9 is a listing of functions of a function library used by the interface device in the embodiment of FIG. 6.

The Arinc429Comm library includes the following functions, listed also in FIG. 9, for performing the following operations: Initialise, Shutdown, Start, Stop, Request 429ParameterList, Request429ParameterListStatus, Request 429Value, PaxOperationalServiceCommand1, PaxOperationalServiceCommand2, PaxCallResetZone, Arinc429Comm State Broadcast, and Arinc429Comm Transmit Manager.

Each of the functions is described below in more detail.
Initialise
  The Arinc429Comm will execute the in-flight entertainment (IFE) startup sequence to reach the normal operation state of "PES_MAXI_OPERATION" as per Airbus Technical Specification Appendix 10 s1.2.1.1
Shutdown
  The Arinc429Comm will execute the sequence to enter state of "PES_NOT_READY" as per Airbus Technical Specification Appendix 10 s1.2.1.1
Start
  The ARinc429Comm will start reading from the CIDS constant update data words. The Arinc429Comm will create a timed thread to read from the 429 serial input. The thread will have a configurable throttle timer to delay read ticks by 0-180000 ms. On timer ticks, if the previous read operation has completed, the Arinc429Comm will read the next data word from the 429 serial input.
  Begin Read dataword
  Set blReading=true;
  If Recording is enabled, write dataword, time and channel to the log file.
  Inspect word label
  If label is monitored
    Process label to extract data
    Validate extracted data
  If valid
    Write data values to parameter database Else
  Discard
If label is not monitored, discard.
Set blReading=false;
End Read
Stop
  The Arinc429Comm will cease reading from the CIDS constant update datawords.
Request429ParameterList
  The Arinc429Comm will return a collection of Parameter objects describing the list of datawords being monitored in the Arinc429Comm including label, type, description and name. The list will not include status or value for each parameter.
Request429ParameterListStatus
  The Arinc429Comm will return a collection of Parameter objects describing the list of datawords being monitored in the Arinc429Comm,including parameter ID and status. Status will indicate whether data for that label has been received within the data expiry tine limit for that parameter.
Request 429Value
  The Arinc429Comm will return the current value for the requested parameter ID.
PaxOperationalServiceCommand1
  The Arinc429Comm will identify a seat by Deck, Room (zero is entire cabin), Row number, Seat letter. The command 1 will specify 3 boolean values for light on/off, call bell on/off and call reset/not reset.
PaxOperationalServiceCommand2
  The Arinc429Comm will identify a seat by Deck, Room (zero is entire cabin), Row number, Seat letter. The command 2 is to be used when light dimming is required. It will specify3 boolean values for dimmer increment by one, dimmer decrement by one, and dimmer ON or OFF toggle. Only one value of the three should be true. If no value is true no action will be performed.
PaxCallResetZone
  The Arinc429Comm will identify an application area by Deck and (Zone OR Room)
  If the Zone and Room are not specified then all zones (not rooms) will be reset for the selected deck.
Arinc429Comm State Broadcast
  While in the PES_READY state following successful initialise command the Arinc429Comm will send the constant status data word sequence at 2000 ms intervals, with approximately 100 ms between each word, (0.3~250 msec)
EQ_ID_PES,VERSION_ID_PES,READY_CMD_PES,
GEN_STATUS_CMD_1_PES,
THEME_MUSIC_CMD_1_PES,
THEME_MUSIC_CMD_2_PES
Arinc429Comm Transmit manager
  The transmit manager will ensure that PSS commands initiated during a status transmit block will be sent as soon as the current status word has completed. This will ensure minimum latency for command response.
  It will be understood that whilst the embodiments described herein in relation to FIGS. 1 to 9 include particular components and arrangements of those components, any suitable type and arrangement of components. For example, any suitable type of processor, server, client devices, displays and wired or wireless communication circuitry may be used in alternative embodiments. Furthermore the interface apparatus can be used to provide an interface, and to enable communication between any suitable aircraft systems and/or devices, and/or to provide control an aircraft system by another aircraft system or device or vice versa, regardless of any differences in data formats used by the different aircraft systems or devices.

Alternative embodiments, or features of such alternative embodiments, can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. An aircraft interface apparatus for providing communication between an aircraft system and a plurality of passenger portable electronic devices for use on an aircraft in-flight, wherein the aircraft system comprises a flight management system that uses a first data format and the plurality of passenger portable electronic devices use a second data format and the aircraft comprises an aircraft passenger cabin, wherein:
  the aircraft interface apparatus is configured to receive at least one of flight position or flight progress data from the flight management system and convert the flight position or flight progress data from the first data format to the second data format and to transmit wirelessly said at least one of flight position or flight progress data to the plurality of passenger portable electronic devices in the aircraft passenger cabin, and wherein the plurality of passenger portable electronic devices have read-only access to the flight position or flight progress data from the management system;
  the flight position or flight progress data is processable by each of the plurality of passenger portable electronic devices to display on said passenger portable electronic device at least one of a) or b):—
  a) a moving map;
  b) an image representative of flight position or flight progress.

2. An interface apparatus according to claim 1, wherein the plurality of passenger portable electronic devices comprise a mobile telephone, a portable computer, a personal digital assistant (PDA), or a portable entertainment system.

3. An interface apparatus according to claim 1, comprising an interface processing resource that applies a security protocol to communications from the plurality of passenger portable electronic devices.

4. An interface apparatus according to claim 3, wherein the interface processing resource applies the security protocol to exclude the plurality of passenger portable electronic devices from interfering with operation of a flight management system.

5. An interface apparatus according to claim 3, wherein the security protocol comprises a secure socket layer (SSL) protocol or a transport layer security (TLS) protocol.

6. An interface apparatus according to claim 1, comprising an interface processing resource that is configured to receive data comprising an instruction in a first format from the plurality of passenger portable electronic devices in-flight, to convert the instruction into a corresponding instruction in a second format that is actionable by the aircraft system, and to output data comprising the corresponding instruction in the second format to the aircraft system in-flight.

7. An interface apparatus according to claim 1, comprising a wireless transceiver for providing wireless communication with the plurality of passenger portable electronic devices.

8. An interface apparatus according to claim 1, wherein the flight position or flight progress data is processable by each of the plurality of passenger portable electronic devices to display on said passenger portable electronic device: data representative of flight position or flight progress.

9. A method of providing data to a plurality of passenger portable electronic devices for use on an aircraft in-flight, wherein the aircraft comprises a flight management system that uses a first data format and the plurality of passenger portable electronic devices use a second data format and the method comprising:
  receiving at least one of flight position or flight progress data from the flight management system and converting the flight position or flight progress data from the first data format to the second data format;
  transmitting wirelessly said at least one of flight position or flight progress data to the plurality of passenger portable electronic devices wherein the plurality of passenger portable electronic devices have read-only access to the flight management system;
  processing the flight position or flight progress data by the plurality of passenger portable electronic devices to display at least one of a) or b):—
  a) a moving map;
  b) an image representative of flight position or flight progress.

\* \* \* \* \*